United States Patent [19]
Treilhard

[11] 3,804,969
[45] Apr. 16, 1974

[54] ELIMINATION OF SIDE WALL EROSION IN ELECTRIC FURNACES

[75] Inventor: Donald G. J. Treilhard, St. Bruno, Quebec, Canada

[73] Assignee: Cities Service Company, New York, N.Y.

[22] Filed: Dec. 19, 1972

[21] Appl. No.: 316,615

[52] U.S. Cl. .................................. 13/35, 266/43
[51] Int. Cl. ................................................. F27d 1/16
[58] Field of Search .......................... 13/9, 35; 266/43

[56] References Cited
UNITED STATES PATENTS
3,619,467  4/1970  Goodman ........................... 13/35
3,167,420  1/1965  Robiette ........................... 13/9 X
3,213,178  10/1965  Sem ................................. 13/9

Primary Examiner—Roy N. Envall, Jr.
Attorney, Agent, or Firm—Joshua J. Ward

[57] ABSTRACT

An improved smelting process and electric furnace design for smelting metallic ores by the slag resistance method wherein the furnace includes at least one stepped and fettled wall. The improvement is characterized by fettling positioned on the stepped portion of the wall to reduce or eliminate erosion of the furnace walls in contact with the slag zone.

9 Claims, 1 Drawing Figure

PATENTED APR 16 1974　　　　　　　　　　　　　　3,804,969
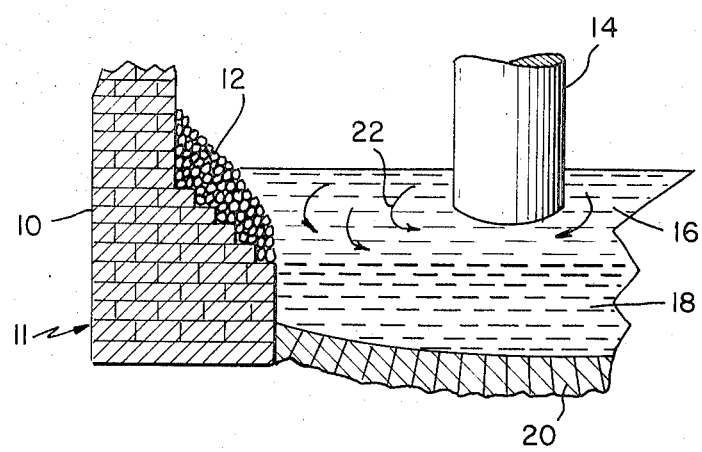

ELIMINATION OF SIDE WALL EROSION IN ELECTRIC FURNACES

BACKGROUND OF THE INVENTION

Conventional electric furnaces that smelt metallic ores, such as copper and nickel sulfide bearing materials, have a campaign life that is generally limited to between 1 and 5 years due to side wall erosion. This erosion occurs primarily in the vicinity of the slag layer of the furnace and is due to the chemical action of the furnace slag intensified by the stirring action of the electrodynamic currents in the furnace slag bath. The furnace roof and upper side walls will normally experience little or no erosion because the temperatures above the furnace bath normally do not exceed 1,000° F. and the walls and roof are usually constructed of firebrick. In comparison, the furnace side walls from just above the maximum expected slag level to the bottom of the furnace itself may be exposed to operating bath temperatures of up to approximately 2,550° F. These walls are usually constructed of high grade basic brick of magnesite composition to meet the more severe operating requirement. The combined effect of this high temperature, the chemical erosion by the slag, and the turbulence caused by the passage of electric current through the slag cause slow erosion of the furnace side wall where it is in contact with the molten slag layer.

Therefore, what is needed and what I have invented is an improved smelting process and electric furnace design that eliminates furnace side wall contact with the slag layer and diminishes the intensity of the electrodynamic currents in this critical area.

SUMMARY OF THE INVENTION

Broadly, this invention provides an improved electric furnace design for smelting metallic non-ferrous ores by the slag resistance method. The furnace will have a floor, at least one stepped wall, and a top incorporating at least one electrode disposed internally. The improvement is characterized by replenishable fettling positioned on the stepped portion of the wall to prevent erosion of the wall in the slag zone. An improved process for smelting copper bearing materials in an electric furnace having stepped walls is also provided; this improvement being characterized by the placing of replenishable fettling, preferably copper bearing, on the walls.

BRIEF DESCRIPTION OF THE DRAWINGS

The drawing is a representation of an electric furnace embodying the invention.

DETAILED DESCRIPTION OF THE INVENTION

The bath of an electric furnace used in the smelting of metallic ores containing sulphur, concentrates and/or calcines, includes a slag layer and a matte layer. Erosion of the furnace walls generally occurs in the vicinity of the slag layer due to intensified chemical erosion caused by the violent stirring action of the electrodynamic currents in the furnace slag bath. Temperatures in the slag layer of the furnace may range as high as 2,550° F., depending upon slag composition.

The matte layer in the furnace is situated below the slag layer and extends down to the furnace floor. The matte layer is very conductive to both heat and electricity, and little heat is generated in this layer due to electrical resistance. Little erosion of the walls and bottom in contact with the matte layer occurs providing that matte depths are not allowed to fluctuate beyond a range of about 10 inches, and matte depths are maintained in excess of 10 to 15 inches, preventing electrodes from approaching too close to the furnace bottom. Dissipation of the heat from the high temperature slag zone around and just below the electrodes in contact with the slag layer in the furnace is rapid due to the highly conductive heat reservoir formed by the matte layer. Therefore, the only portions of the electric furnace exposed to appreciable wear are the matte and slag tapholes, and the furnace side and end walls in contact with the slag layer.

Matte taphole life can be extended indefinitely by providing two or more tapholes which are rotated regularly, by routine scheduled changing of a matte tapping plate, and by renewal of brick work around a taphole when it becomes necessary. Slag taphole life can be extended indefinitely by regular rotation of three or more slag tapholes across the slag tapping end of the furnace, by frequent changing of the outside matte tapping blocks, and by renewal of the brick work around any tapping hole as required.

The brick walls in contact with the furnace slag layer present a more difficult erosion problem. As was previously mentioned, the combined effect of the chemical erosion by the slag, the turbulence caused by the passage of electric current through this slag, and the high temperatures cause erosion of furnace walls in contact with the slag. There are a number of solutions by which this erosion can be counteracted. First, most smelting done in electric furnaces occurs within 2.3 diameters of the electrode tip. Therefore, by widening an electric furnace, side wall erosion can be reduced. However, furnace outside width is limited to approximately 33 feet because of the strength limitations of natural sprung roof archs. A second solution to increase side wall life is to increase side wall thickness. Gouging due to erosion of the side walls by slag attack will still occur and cause the brick above the gouge to collapse into the furnace when the gouge becomes deep enough. Since none of these solutions are practical or economical, it became necessary to invent a novel smelting process and modified electric furnace design that will limit the erosion of the side walls in the furnace.

The invention consists of providing stepped side walls on the furnace back from the top of the matte layer to just below the top of the maximum expected slag level; and by feeding fettling regularly to this sloping shelf. The fettling should be about ¼ inch to about 5 inches in diameter, with the preferred range being approximately 1 inch to 3 inches. Fettling should be added on a daily basis or more frequently if required; it being assumed that the main portion of the metal bearing furnace charge is added in a free flowing condition either as dried concentrates and flux mixture, or as a roasted calcine through roof charging pipes closer to the electrodes. In the case of copper smelting furnaces, the fettling is preferably solid copper bearing material or other material of higher specific gravity than the molten slag material but lower specific gravity than the heavier matte layer. It has been found that fettling of an approximate specific gravity of from 3.2 to 5.0 is heavy enough to sink through the slag layer but light enough not to continue through the matte layer which usually has a specific gravity of about 5.0. The practice of this invention with the foregoing conditions successfully combats all the factors leading to side wall erosion thus virtually eliminating side wall wear in the vicinity of the slag layer.

The slope of the stepped side wall may be any acute angle, shallow enough so that the fettling may be supported. In a preferred embodiment, the slope of the side walls should be in the 35° to 50° range in order that the angle of repose of the charged solid material is not greatly exceeded, and at the same time the thickness of the furnace wall in the vicinity of the matte tapping holes is not unnecessarily great. Preferably, the fettling of the side walls should extend approximately from the top of the matte layer to approximately the top of the slag layer for a number of reasons. The matte area of the side and end walls is not attacked by erosion so extra protection for this area is not required. Also, stepping of the side walls in the vicinity of the slag layer will considerably lessen erosion even without the regular addition of fettling. Electrodynamic currents in the slag bath short circuit back to the electrodes through the matte layer. As the matte layer can be expected to terminate at the bottom of the sloped ledge, returning electrodynamic slag currents will be concentrated in this region where the wall is thickest and above this point and outwards away from the sloped ledge, hence bath turbulence and side wall erosion will be minimized.

Referring now to the drawing, there is seen a stepped wall 10 of an electric furnace, generally illustrated as 11, supporting fettling 12 which is situated from approximately the top of matte layer 18 to approximately the top of slag layer 16 to prevent erosion of stepped wall 10 due to the stirring action of electrodynamic currents 22 which are created by electrode 14. Also seen in the drawing is furnace bottom 20 supporting matte layer 18 and slag layer 16. When fettling 12 are substantially eroded, it may be replenished at periodic intervals such as daily.

While this invention has been illustrated by the foregoing discussion, it will be understood that the scope of the invention is limited only by the appended claims.

I claim:

1. An improved electric furnace for smelting metallic ores, said furnace having a floor at least one electrode disposed internally, and at least one stepped wall having replenishable fettling positioned thereon to prevent erosion of said wall.

2. The furnace of claim 1 additionally including a lower matte layer, and an upper slag layer formed on said floor during said smelting of metallic ores and in which said wall is stepped and fettled from approximately the top of said matte layer to approximately the top of said slag layer to prevent said slag layer from eroding said wall.

3. The furnace of claim 2 wherein the entire wall area of furnace in contact with said slag layer is substantially covered with fettling.

4. The furnace of claim 2 wherein said stepped and fettled wall has a slope between approximately 35° and approximately 50°.

5. The furnace of claim 1 wherein said fettling is approximately ¼ inch to about 5 inches in diameter.

6. The furnace of claim 1 wherein said fettling is copper bearing material with a specific gravity between about 3.2 and 5.0 and has a diameter of between approximately 1 inch and 3 inches.

7. An improved process for smelting metallic ores in an electric furnace comprising the steps of providing at least one stepped wall in said furnace and placing replenishable fettling on side stepped wall.

8. The process of claim 7 additionally including replenishing the fettling at periodic intervals after same has eroded.

9. The process of claim 8 wherein the fettling is replenished on a daily basis.

* * * * *